UNITED STATES PATENT OFFICE.

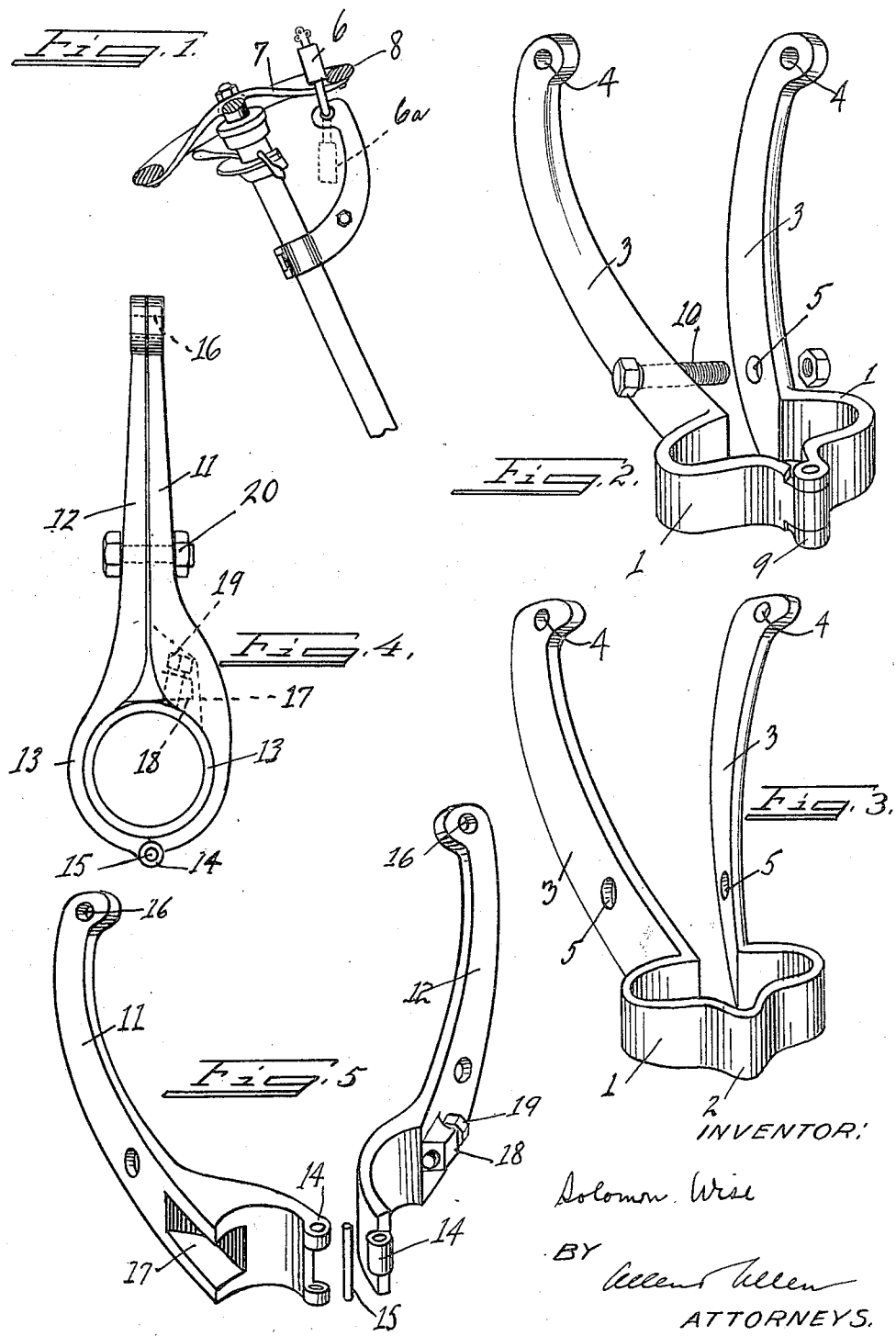

SOLOMON WISE, OF CINCINNATI, OHIO.

STEERING-WHEEL LOCK.

1,410,637.     Specification of Letters Patent.     Patented Mar. 28, 1922.

Application filed December 21, 1920. Serial No. 432,327.

*To all whom it may concern:*

Be it known that I, SOLOMON WISE, a citizen of the United States, and a resident of the city of Cincinnati, in the county of Hamilton and State of Ohio, have invented certain new and useful Improvements in Steering-Wheel Locks, of which the following is a full, clear, and exact description, reference being had to the accompanying drawings, forming a part of this specification.

My invention relates to devices for use in the locking of automobile steering wheels in a fixed position, thereby preventing the driving away of the machine by an unauthorized person.

The method of locking a steering wheel by means of a bracket set in place on the casing surrounding the steering column in motor vehicles, is a common method of preventing theft of such vehicles, and my invention relates to improvements in such devices.

Among other things it is my object to provide a very simple form of bracket, which may be set up as a more or less permanent fixture on the steering column casing and which presents an eye adjacent the spokes of the steering wheel which will accommodate an ordinary padlock.

I am enabled by this mechanism to utilize the padlock both for purposes of locking the steering wheel in a fixed position, also for preventing the removal of the bracket from the steering column casing.

It is my object to provide a simple form of bracket for use with Ford cars or other types having an odd shaped steering column casing, and a more detailed but adequate and simple device for use with truly cylindrical casings.

These objects and other advantages to be noted I accomplish by that certain construction and arrangement of parts to be hereinafter more specifically pointed out and claimed.

In the drawings,

Figure 1 is a perspective view showing my device and use as in a Ford car.

Figure 2 is a perspective view of a hinged form of bracket.

Figure 3 is a like view of the simpler one piece form of bracket.

Figure 4 is a plan view of the type of bracket used with cylindrical steering column cases.

Figure 5 is a perspective view (disassembled) of the device shown in Figure 4.

It should be noted that in Ford automobiles, and certain other types of machines, the steering column is encased with an oval shaped tube, and running along one edge thereof is a smaller protuberance which in outline has the shape of a longitudinal ridge or rib.

A bracket to clasp such a casing should have an oval conformation with an additional bend to take care of the rib above referred to, and when such a shaped clamping member is mounted over such a shaped casing, it will not revolve thereon even if loosely held.

Referring first to Figure 3 showing the simpler form of bracket, I show a metal stamping formed of sufficiently heavy sheet metal, same having an oval shaped portion 1, a central bend 2, and arms 3, 3, which when the oval shaped portion is closed, will abut against each other. The arms have eyes 4, 4, in their ends which register with each other, and bolt holes 5, 5, which also register.

In mounting such a device on the steering column casing, the piece is sprung over the casing and fastened together by means of a bolt passing through the bolt holes above noted. The device should be so mounted that the arms will extend up to a point closely adjacent the steering wheel, inside of its periphery, the said arms being located at the side of the wheel away from the driver so as not to interfere.

Any suitable padlock 6 may then be used to hook over the spoke 7, of the steering wheel 8, and engage in the eyes in the ends of the two arms. When so engaged the padlock prevents the removal of the bracket devices from its mounting, because the removal of the bolt will not free the two arms from being held together by the padlock.

Also the ends of the arms are so bent that when not in use the padlock may be hooked into the eyes 4, and permitted to swing free of interference with the steering wheel, as shown at 6ª.

A heavier device on the same principle may be formed of two pieces, made up to have each a half of the oval and rib conformation, and one of the arms. Instead of the bending of the metal at the rib portion a hinge 9 is formed between the two pieces, the same reference numerals being applied to the showing of this hinged structure, as otherwise it is the same as the unitary form. In Figure 2 illustrating this form, the bolt 10 is shown, which secures the bracket in permanent position on the steering column casing. A like bolt is used in the form shown in Figure 3.

Another adaptation of the hinged form is used for mounting on cylindrical column casings. Thus I show the two arms 11, 12, each having a half round termination 13, and a hinge portion 14, for use with a suitable hinge pin 15. In setting the hinge pin in this and my other hinged construction I prefer that the pin be burred over at both ends so as to make it impossible to drive it out without drilling off the ends. The padlock eyes are the same, as at 16, 16, and when the device is closed over a cylindrical mounting piece, it should fit fairly closely.

The arm 11 has a cavity 17 therein, and the arm 12 a lug 18 which fits within said cavity. This lug serves as a mounting for a set screw 19, which engages and non-rotatably holds the bracket in place on a cylindrical casing. The screw is more than a half circle away from the hinge or pivot so as to clamp the device independent of the other arm.

In setting up the device the operator first places the arm 12 over the casing, and screws down the set screw. He then folds the other arm around, and secures the assembly in place with a bolt 20. When the padlock is mounted through the eyes, the arms cannot be spread sufficiently to enable a thief to get at the set screw and release the device.

It may be more desirable to drill a small hole in the column casing to receive the end of the set screw 19, in which case it will act as a key, but it will be understood that the exact method of use forms no particular feature of my invention, the point in this modification being to provide a means of locking the bracket against rotation, which will be inaccessible when the padlock is in place and the device used as a lock for the steering wheel.

Having thus described my invention, what I claim as new and desire to secure by Letters Patent, is:—

1. A locking device for steering wheels of automobiles comprising a pair of arms, interconnecting means between the arms adapted to engage non-rotatably over the parts surrounding the steering column of an automobile, said arms having eyes in the ends thereof, said eyes being adapted to form a continuous opening when the arms are brought together in clamping position to receive the hasp of a padlock, passed over the spoke of a steering wheel.

2. A locking device for steering wheels of automobiles comprising a pair of arms, interconnecting means between the arms adapted to engage non-rotatably over the parts surrounding the steering column of an automobile, said arms having eyes in the ends thereof, said eyes being adapted to form a continuous opening when the arms are brought together in clamping position to receive the hasp of a padlock, passed over the spoke of a steering wheel, and said arms being shaped to extend in a curve upwardly to a point adjacent the said steering wheel, with the portion having the eyes therein so bent as to permit a padlock to hang suspended therefrom without interference with the operation of such wheel.

3. A locking device for steering wheels of automobiles comprising a pair of arms, interconnecting means between them adapted to engage over the parts surrounding the steering column of an automobile, means on one of the arms for engaging non-rotatably the said parts, and means on the other arm to render inaccessible the said first mentioned means, said arms adapted when the interconnecting means is mounted over the said parts to lie adjacent to each other with their upper ends adjacent the steering wheel of said automobile, said upper parts having eyes therein adapted to form a continuous hole to receive the hasp of a padlock which likewise engages over the spoke of said wheel.

4. A locking device for steering wheels of automobiles comprising a pair of arms, interconnecting means between them adapted to engage over the parts surrounding the steering column of an automobile, means on one of the arms for engaging nonrotatably the said parts, and means on the other arm to render inaccessible the said first mentioned means, said arms adapted when the interconnecting means is mounted over the said parts to lie adjacent to each other with their upper ends adjacent the steering wheel of said automobile, said upper parts having eyes therein adapted to form a continuous hole to receive the hasp of a padlock which likewise engages over the spoke of said wheel, said interconnecting means comprising in part a hinge.

5. A locking device for steering wheels of automobiles comprising a pair of arms, interconnecting means between the arms adapted to engage non-rotatably over the parts surrounding the steering column of an automobile, said arms having eyes in the ends thereof, said eyes being adapted to form a continuous hole to receive the hasp of a padlock, passed over the spoke of a steering wheel, and means for securing said interconnecting means over the said parts independent of the said padlock for the purpose described.

6. A locking device for steering wheels of automobiles comprising a pair or arms, interconnecting means between them adapted to engage over the parts surrounding the steering column of an automobile, a set screw on one of said arms so located as to retain said arm in place non-rotatably on the said parts independent of the other arm, and means on the other arm to render inaccessible the said first mentioned means, said arms adapted when the interconnecting means is mounted over the said parts to lie adjacent to each other with their upper ends adjacent the steering wheel of said automobile, said upper parts having eyes therein adapted to receive the hasp of a padlock which likewise engages over the spoke of said wheel, said interconnecting means comprising in part a hinge.

SOLOMON WISE.